(12) United States Patent
Ross

(10) Patent No.: US 6,619,758 B1
(45) Date of Patent: Sep. 16, 2003

(54) WHEEL AND BEARING ASSEMBLY

(76) Inventor: Amara Ross, 3236 Golden Ave., Long Beach, CA (US) 90806

( * ) Notice: Subject to any disclaimer, the term of this patent is extended or adjusted under 35 U.S.C. 154(b) by 0 days.

(21) Appl. No.: 10/083,852

(22) Filed: Feb. 25, 2002

(51) Int. Cl.[7] .................... A63C 17/22; F16C 13/00
(52) U.S. Cl. ............... 301/5.7; 301/5.309; 384/416; 384/449; 384/907
(58) Field of Search .................. 301/5.301, 5.307, 301/5.308, 5.309, 5.7; 384/907, 908, 909, 299, 300, 416, 417, 418, 449

(56) References Cited

U.S. PATENT DOCUMENTS

| | | | | |
|---|---|---|---|---|
| 516,502 A | * | 3/1894 | Mauermann | |
| 1,892,845 A | * | 1/1933 | McGrath | |
| 3,006,382 A | * | 10/1961 | Broome | |
| 4,582,368 A | * | 4/1986 | Fujita et al. | |
| 4,923,761 A | * | 5/1990 | Shindo | |
| 5,352,541 A | * | 10/1994 | Tanaka et al. | |
| 5,655,784 A | * | 8/1997 | Lee | 301/5.7 |
| 5,660,482 A | * | 8/1997 | Newley et al. | 384/909 |
| 5,700,093 A | * | 12/1997 | Hiramatsu et al. | 384/907 |
| 5,732,441 A | * | 3/1998 | Janian | 384/416 |
| 5,871,286 A | * | 2/1999 | Kern et al. | 384/416 |

* cited by examiner

Primary Examiner—Russell D. Stormer
(74) Attorney, Agent, or Firm—Orrick, Herrington & Sutcliffe, LLP

(57) ABSTRACT

There is disclosed herein an improved and simplified wheel and bearing assembly, such as for skates and the like comprising a bearing inner race preferably formed of a plastic material such as polyurethane. A pair of bearing outer races, preferably of a relatively strong material such as titanium, are coupled with outer surfaces of the bearing inner race. Mating surfaces of the bearing inner race and the bearing outer races are configured and are coated with a lubricant to provide bearing surfaces for the wheel.

13 Claims, 7 Drawing Sheets

WHEEL AND BEARING ASSEMBLY

The present invention relates to wheels, and more particularly to a relatively simple wheel and bearing assembly useful for skateboards, skates, toys and the like.

BACKGROUND OF THE INVENTION

Various forms of wheels, including skateboard wheels, have been developed over the years. A typical skate wheel, for example, comprises a rigid annular hub onto which an outer tire is mounted or directly molded. The hub usually is supported by one or a pair of radial bearings which are attached by a shaft to the skate. Skateboard wheels and those for other sport and like items usually have a similar construction. The bearing typically is a ball bearing.

SUMMARY OF THE INVENTION

In accordance with a preferred embodiment of the present invention, a new form of wheel and bearing assembly particularly useful for skateboards, skates and similar devices, as well as toy products, does not incorporate the usual ball bearing assembly but rather comprises a hub in the form of a bearing inner race which supports an outer tire, and a pair of bearing outer races coupled with the inner race. Certain outer surfaces of the bearing inner race and certain inner surfaces of the bearing outer races are configured in a manner to form a mating bearing having a dry film lubricant on the mating surfaces. The tire is molded or otherwise disposed on the inner race and which preferably is formed of polyurethane. The bearing outer races preferably are machined from titanium, aluminum, or a suitable polyurethane. The mating surfaces of the inner race and outer races are provided with a suitable solid film lubricant.

Accordingly, it is a principal object of the present invention to provide a new form of wheel and bearing assembly.

Another object of the present invention is to provide a simple form of wheel suitable for use for skateboards, skates, toys, and other uses.

BRIEF DESCRIPTION OF THE DRAWINGS

FIG. 4 is a detailed cross-sectional view of the assembly, further showing an axle on which it can be mounted, wherein FIG. 5 is an enlarged detailed cross-sectional view of a portion of an inner race and an outer race further illustrating the mating surfaces thereof, wherein

DETAILED DESCRIPTION

Figure 1:
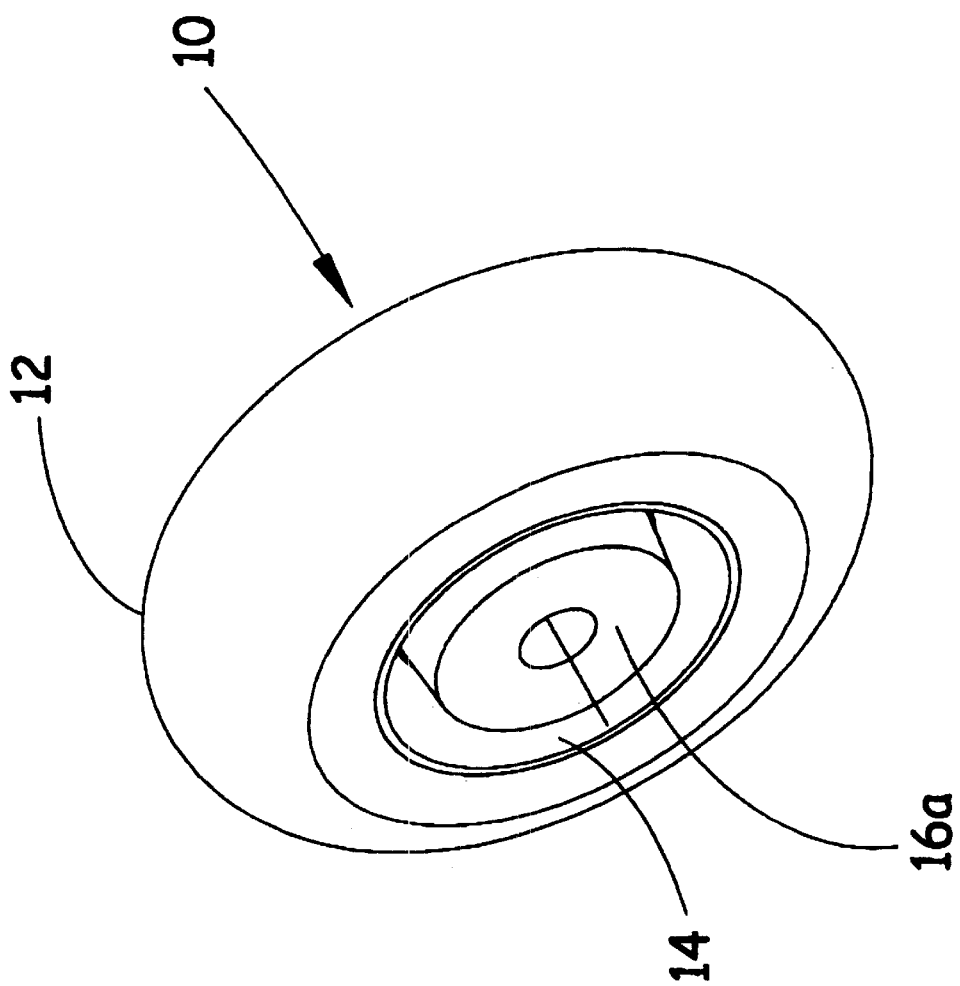
FIG. 1 illustrates a completed wheel and bearing assembly according to the present invention.
Figure 2:
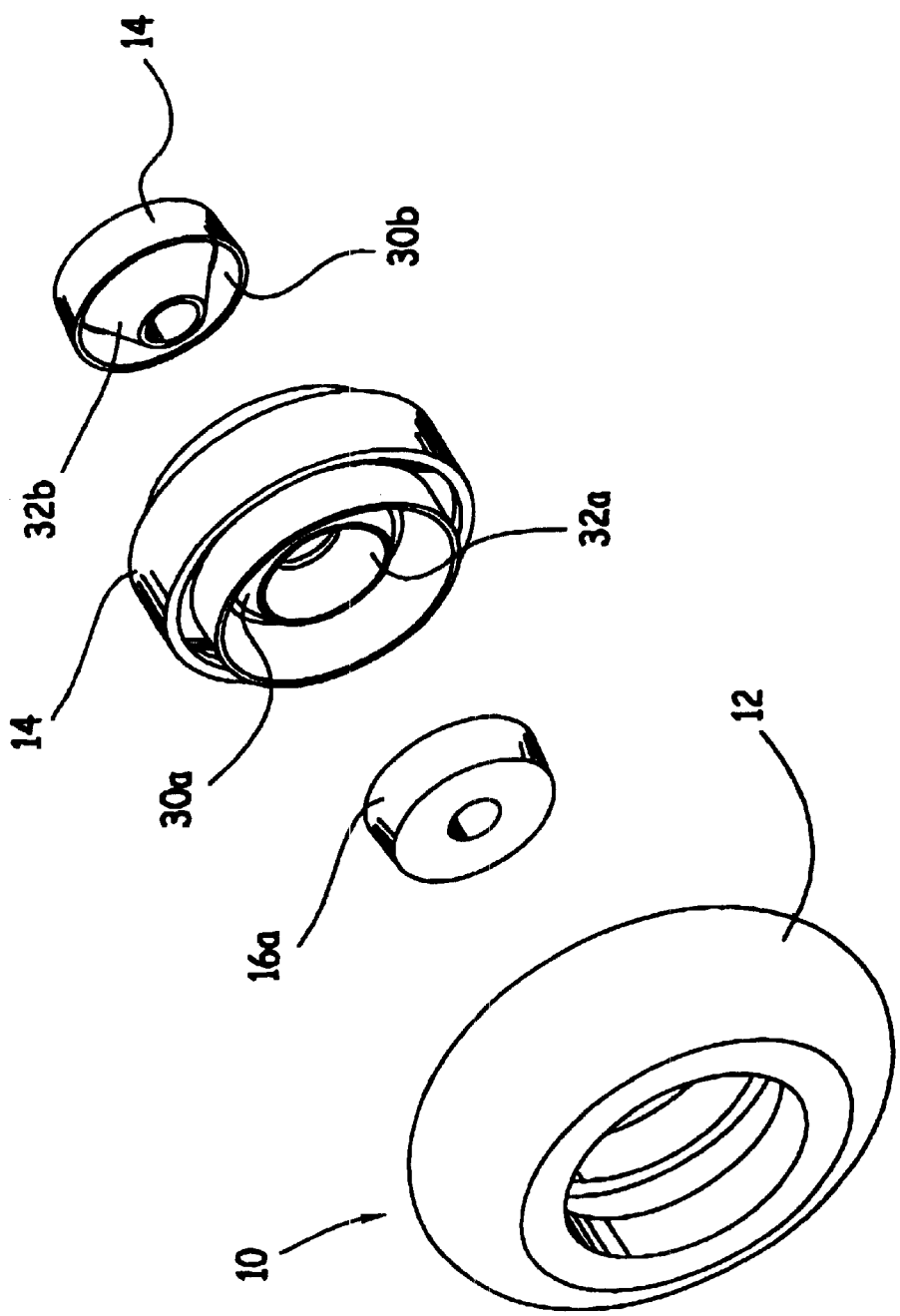
FIG. 2 is an exploded view showing the components of a wheel and bearing assembly of the present invention.
Figure 3:
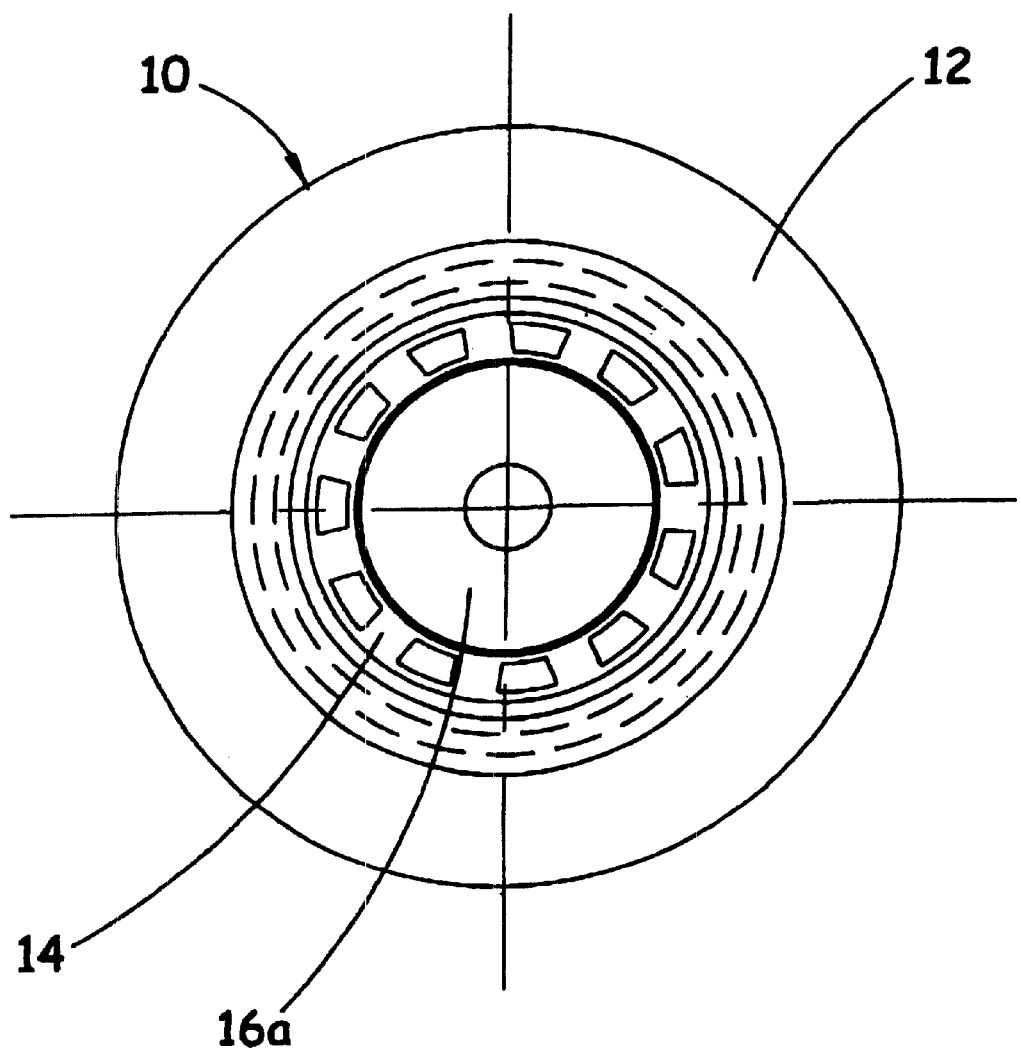
FIG. 3 is a side elevational view thereof.

Turning now to the drawings, FIG. 1 illustrates a wheel 10 having an outer tire 12, bearing inner race 14 forming a hub onto which the tire 12 is mounted or molded, and one bearing outer race 16a of a pair of bearing outer races 16a, 16b. FIG. 2 is an exploded view of the wheel 10 better illustrating in particular the bearing inner race 14 and the bearing outer race 16a and bearing outer race 16b which mate with the inner race 14 on both sides thereof as will be apparent from a review of FIG. 2 (and FIG. 4). FIG. 3 is an elevational view further showing the wheel and its components.

Figure 4A:
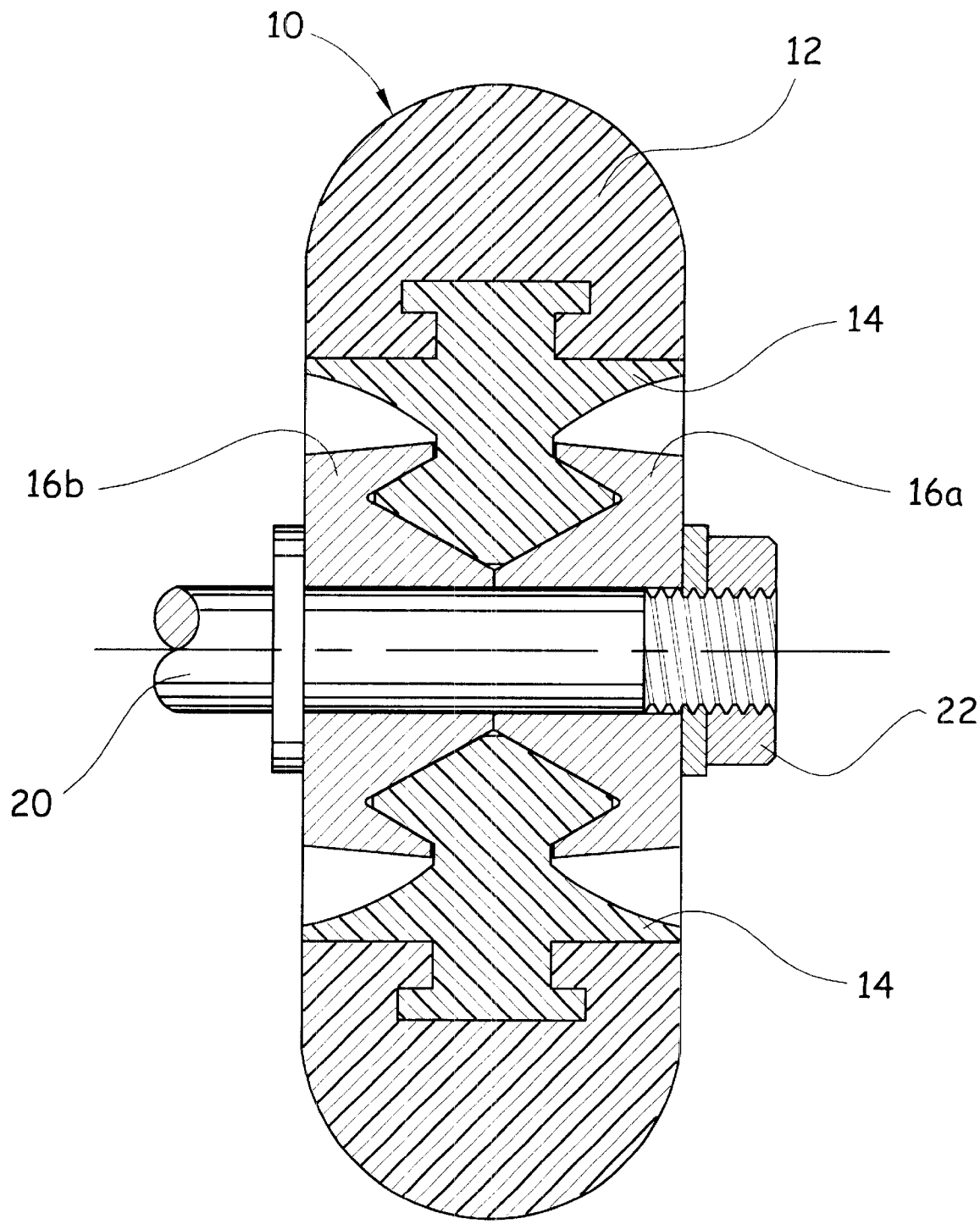
FIG. 4a illustrates outer races of metal and FIG 4a illustrates outer races of plastic.
Figure 4B:
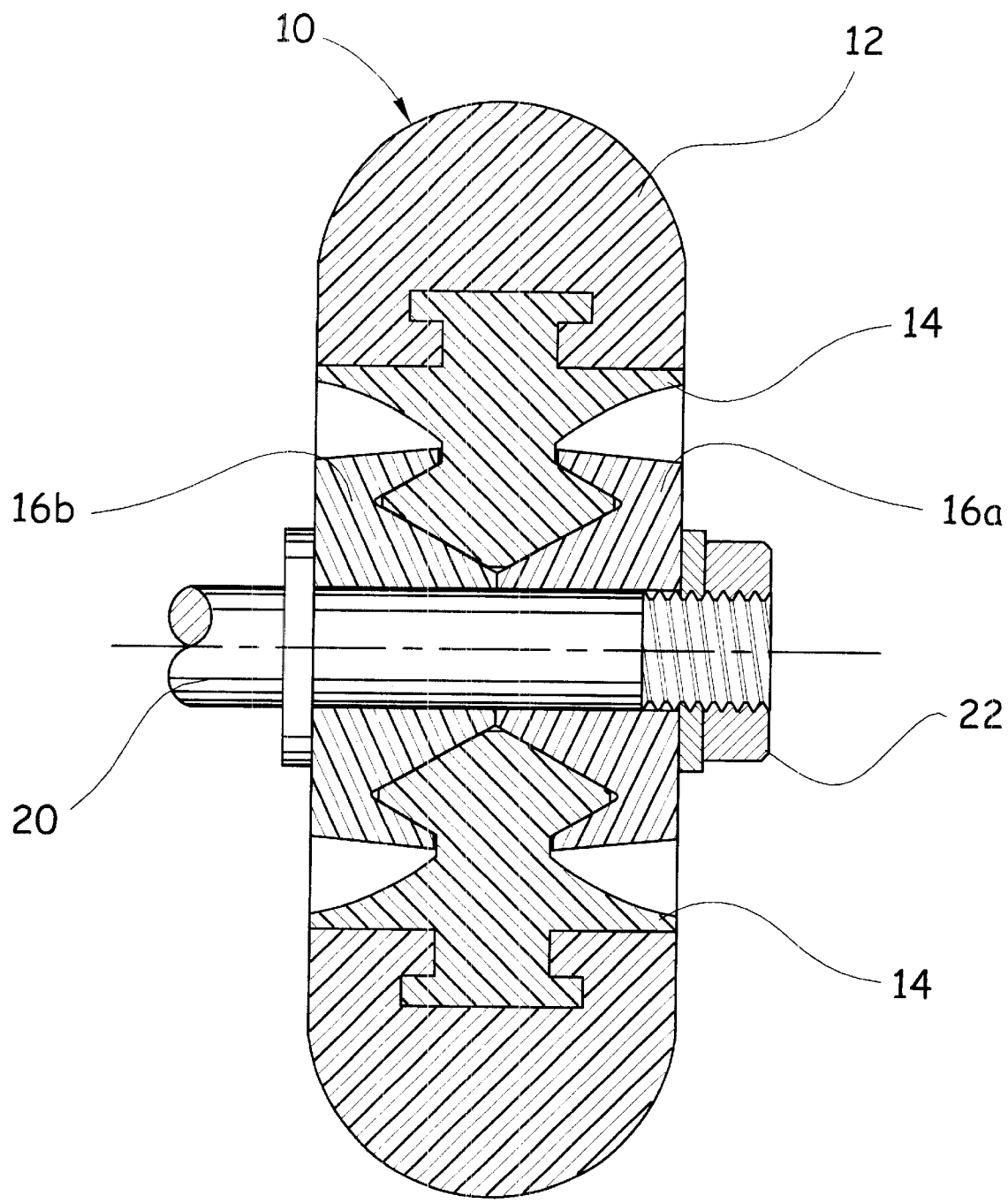
Figure 5A:
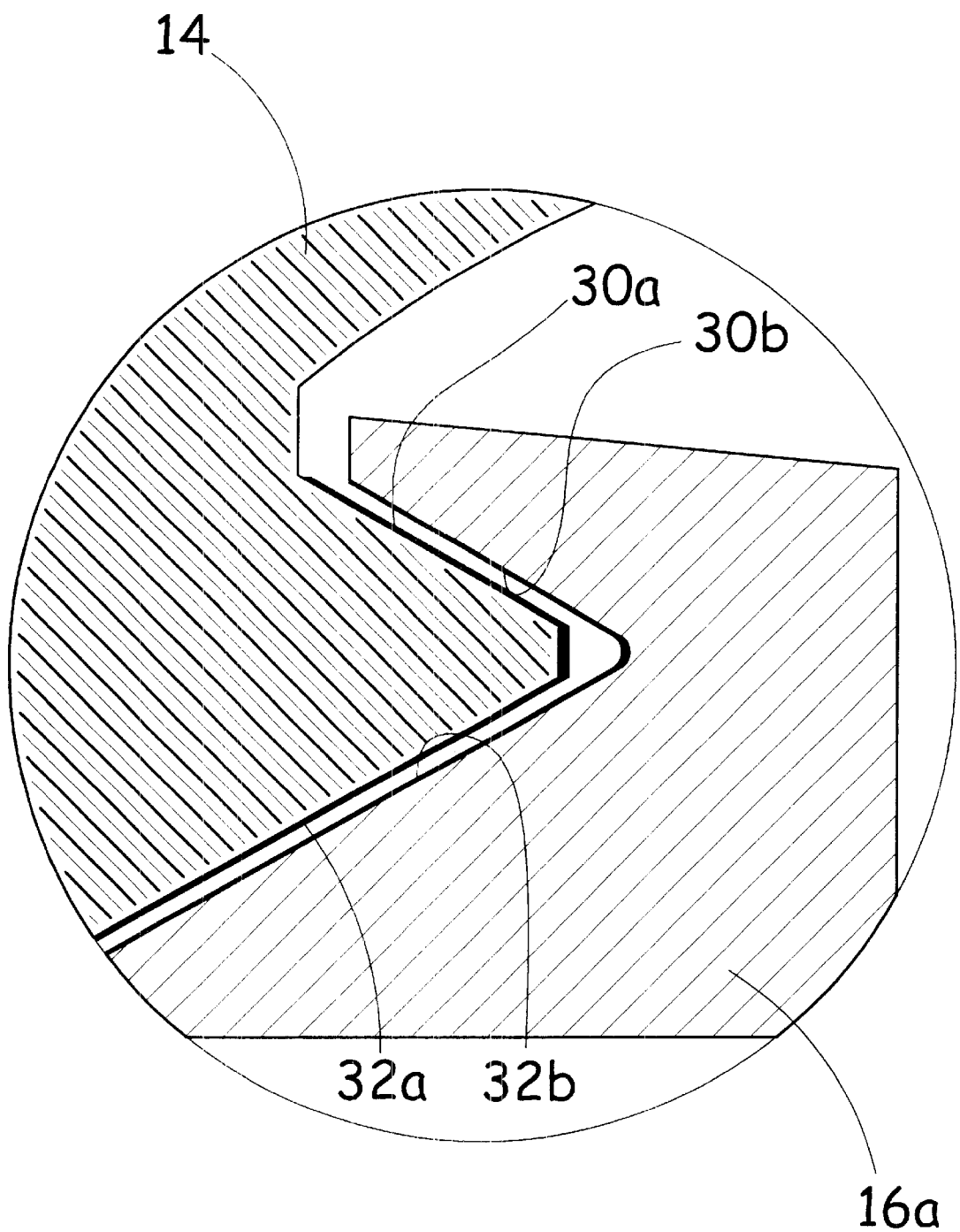
FIG. 5a illustrates an outer race of metal and FIG. 5b illustrates an outer race of plastic.
Figure 5B:
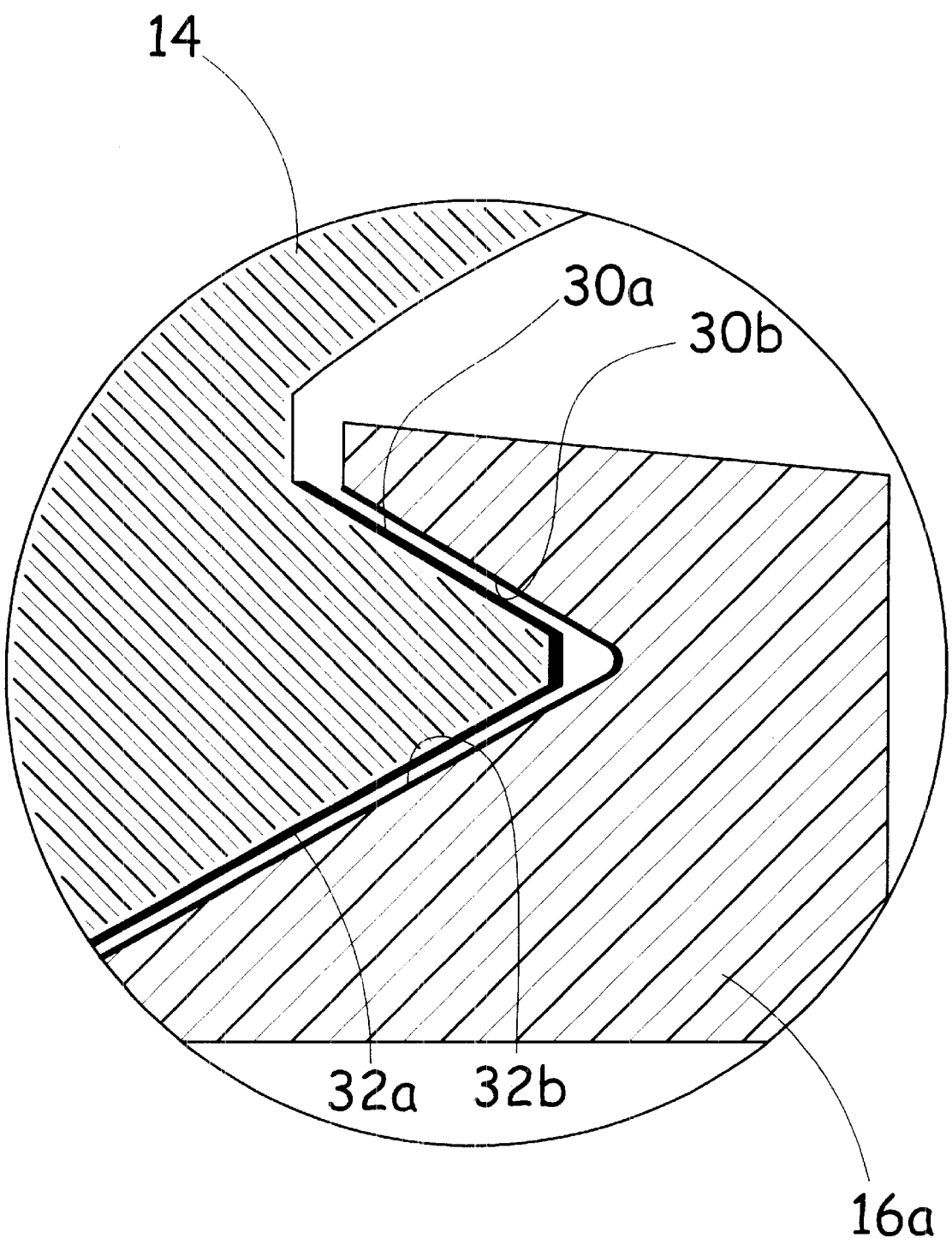

Turning now to FIGS. 4 and 5, FIG. 4 is a detailed cross-sectional view of the entire wheel 10 further illustrating the tire 12, bearing inner race 14 onto which the tire is disposed, and the pair of bearing outer races 16a and 16b. FIG. 4 further illustrates an axle 20, and nut 22 or other fastener, which extends through the outer races 16a, 16b and secures them to the item to which the wheel 10 is attached, such as a skateboard, an inline skate, toy car, and the like (not shown). FIGS. 4a and 5a illustrate the outer race 16 formed of metal, and FIGS. 4b and 5b illustrate the outer race 16 formed of plastic.

Exemplary materials comprise polyurethane for the tire 12, such polyurethane. The bearing inner race 14 preferably is formed of polyurethane of 80D Shore hardness Derometer. The bearing outer races 16a, 16b can be formed of various materials depending on the uses to which the wheel 10 will be placed. For example, for high impact uses, preferably the bearing outer races 16a, 16b are machined of titanium. For medium duty, 7075 aluminum is suitable, and for light duty, polyurethane 80D Shore hardness is suitable.

Still referring to FIG. 4, and particularly to FIG. 5, an important aspect of the present invention is the generally "V" configuration of surfaces 30a, 30b and 32a, 32b. Surfaces 30a, 30b in an exemplary embodiment can be 30 degrees with respect to the axis of the wheel, and surfaces 32a, 32b can be 29 degrees with respect to the axis of the wheel. Importantly, each of these surfaces 30a, 30b, 32a and 32b, 32a and 32b is coated with a solid film lubricant such as Everlube 620C sold by Engineered Coating Solutions. The surfaces 30a, 30b, 32a and 32b are shown thereafter in FIGS. 5a and 5b to represent the coating. The surfaces 30a, 32a, of the race 14 are impregnated with lubricant during molding of the race 14. The lubricant is baked on the surfaces 30b and 32b of the races 16a and 16b. The inner race 14 can be molded, and the tire 12 can be molded onto the outer circumference of the inner race 14, or mounted thereon in any other suitable manner. When the tire 12 is worn, the tire 12 and race 14 (which acts as a hub) assembly is discarded.

As noted earlier, wheels according to the present invention are particularly useful for skate devices, such as inline skates, skateboards, as well as toys. Furthermore, wheels according to the present invention can be used in other applications, even including items such as bicycles and the like.

While an embodiments of the present invention have been shown and described, various modifications may be made without departing from the scope of the present invention, and all such modifications and equivalents are intended to be covered.

What is claimed is:

1. A wheel and bearing assembly comprising
   a bearing inner race having axially outwardly facing surfaces of a general "V" shape wherein the apexes of the "V" axially face outwardly, and having an outer circumference on which a tire is disposed,
   a pair of bearing outer races each having an inner surface configured to mate with the respective outwardly facing surfaces of the inner race, and having axial holes therethrough through which an axle can extend for supporting the wheel, and
   a film lubricant on the mating surfaces of the inner and outer races.

2. An assembly as in claim 1 wherein the tire is formed of polyurethane, the inner race is formed of polyurethane, and the outer bearing races are formed of metal.

3. An assembly as in claim 2 wherein the outer races are formed of titanium.

4. An assembly as in claim 2 wherein the outer races are formed of aluminum.

5. An assembly as in claim 1 wherein the tire, inner race and outer races are formed of plastic.

6. An assembly as in claim 5 wherein the plastic is polyurethane.

7. An assembly as in claim 6 wherein the inner and outer races are formed of polyurethane 80D Shore hardness.

8. An assembly as in claim 1 wherein the lubricant is a solid film lubricant.

9. An assembly as in claim 8 wherein the lubricant is impregnated in the inner race.

10. An assembly as in claim 8 wherein the lubricant is baked on the outer races.

11. An assembly as in claim 1 wherein the tire is molded onto the outer circumference of the inner race, and is disposable.

12. An assembly as in claim 1 wherein the outwardly facing surfaces of the inner race and the inner surfaces of the outer races are formed in a substantially mating "V" shape having surface angles approximately thirty degrees with respect to the axis of the wheel.

13. A wheel without ball or roller bearings comprising an inner race forming a hub and having axially outwardly facing surfaces of a general "V" shape wherein the apexes of the "V" axially face outwardly, and having an outer circumference on which a tire may be disposed, a pair of bearing outer races each having an axially extending inner surface configured to essentially mate with the respective outwardly facing surfaces of the inner race, the outer races each having an axial hole through which an axle can extend for supporting the wheel, and a dry film lubricant on the mating surfaces of the inner and outer races.

\* \* \* \* \*